June 4, 1968 T. S. REED ETAL 3,386,309

ADJUSTABLE STEERING MECHANISM

Filed Nov. 26, 1965 10 Sheets-Sheet 1

INVENTOR
THOMAS S. REED
EDWARD S. STANUCH
BY Joseph W. Malleck
Atty

ADJUSTABLE STEERING MECHANISM

INVENTOR
THOMAS S. REED
EDWARD S. STANUCH
BY Joseph W. Malleck
Atty

ADJUSTABLE STEERING MECHANISM

INVENTOR
THOMAS S. REED
EDWARD S. STANUCH
BY Joseph W. Mallack
ATTY

ADJUSTABLE STEERING MECHANISM

Filed Nov. 26, 1965 10 Sheets-Sheet 4

INVENTOR
THOMAS S. REED
EDWARD S. STANUCH
BY
Joseph W. Malleck

ADJUSTABLE STEERING MECHANISM

Filed Nov. 26, 1965 10 Sheets-Sheet 5

INVENTOR
THOMAS S. REED
EDWARD S. STANUCH
BY

Atty.

ADJUSTABLE STEERING MECHANISM

INVENTOR
THOMAS S. REED
EDWARD S. STANUCH
BY Joseph W. Malleck
Atty

ADJUSTABLE STEERING MECHANISM

Filed Nov. 26, 1965 10 Sheets-Sheet 7

INVENTOR
THOMAS S. REED
EDWARD S. STANUCH
BY Joseph W. Malleck
Atty

INVENTOR
THOMAS S. REED
EDWARD S. STANUCH
BY Joseph W. Mallack
Atty

INVENTOR
THOMAS S. REED
EDWARD S. STANUCH
BY Joseph W. Malleck
Atty

INVENTOR
THOMAS S. REED
EDWARD S. STANUCH
BY Joseph W. Malleck
ATTY

United States Patent Office 3,386,309
Patented June 4, 1968

3,386,309
ADJUSTABLE STEERING MECHANISM

Thomas S. Reed, Glen Ellyn, and Edward S. Staunch, Jr., Crestwood, Ill., assignors to Borg-Warner Corporation, Chicago, Ill., a corporation of Illinois Filed Nov. 26, 1965, Ser. No. 509,907
14 Claims. (Cl. 74—493)

ABSTRACT OF THE DISCLOSURE

A unitary control lever actuates one or more locking mechanisms to enable a tubular column to flex and/or telescope.

This invention relates to steering devices and more particularly to adjustable steering devices for automotive use.

The pertinent art to date has suggested various approaches to providing pivotal adjustment of a steering wheel comprising the use of frictional locks in conjunction with various kinds of universal joints, the use of sprag clutches, and pin-detent assemblies. Although these approaches have permitted universal or single plane angular adjustment, the need for additionally moving the steering head in a lineal direction becomes important in view of severe and unusual space requirements of a passenger vehicle, and the desire to provide freer access and egress for the driver. To this latter need, the art has further suggested means for achieving adjustment which would comprise longitudinal movement of the steering column as well as angular adjustment of a steering head. However, the latter approaches have been deficient in one or more of the following aspects: no unitary control which would regulate both longitudinal and angular movements, the placement of a pivot for the steering head too remote from the mechanism thereby requiring excessive arcuate movements, utilizing the retracted position of the steering mechanism solely for the convenience of the operator to make freer access or egress without the ability to steer in such retracted position or the employment of locking means (for either longitudinal or angular connections) which is not sufficiently positive to withstand the steering loads experienced during the expected life of the mechanisms.

Therefore, a primary object of this invention is to provide a steering mechanism having a column capable of being adjusted by operation of a single control member to effect adjustment simultaneously or sequentially in both a lineal direction (taken with respect to the steering column) and an angular direction (about a pivot closely adjacent to the steering wheel) while permitting steering in any of the adjusted positions.

Structural features pursuant to the above primary object, comprise, in part, the following: (a) the employing of independent steering linkage and supporting structure or housing for the linkage, the steering linkage being flexibly jointed for both longitudinal (slip) and angular movement sychronously with the supporting structure (which is primary tri-partite); the sections of the supporting structure are characterized by double walls with lowermost portion being held against movement; (b) the provision of angular adjustment structure totally unexposed and carried internally within the uppermost section of the supporting structure; (c) the provision of a normally locked, selectively releasable slip lock (for lineal adjustment) which is comprised of a coiled spring clutching element; (d) the provision of positive (nonfrictional) locking means, which is normally closed and selectively releasable and is characterized by toothed elements, one element must be integral with a J-bracket forming a part of a journalling member for the angular pivot structure and another element which is carried on a pantograph structure, both the J-bracket and pantograph contributing to a more compact steering mechanism; and (e) the provision of bearing means for supporting the steering linkage within the various portions of the supporting structure for anti-friction lineal movement, the bearing means being particularly characterized by relatively unrestrained (in the longitudinal direction) helical garter springs which not only permit the relative sliding movement of the sections but experience rolling of the springs about their own centerline.

Another object of this invention is to provide a safety feature for a steering mechanism whereby the impact of the driver on the steering device during a collision will automatically cause the steering column to telescope toward the base or floor board of the vehicle and stay in the retracted position; such structural feature thereby obviates the serious hazard that rigid steering columns or those which are resiliently biased have presented in the past.

Other objects and advantages of this invention will become more apparent from the following detailed description taken in connection with the accompanying drawings in which.

Figure 1:
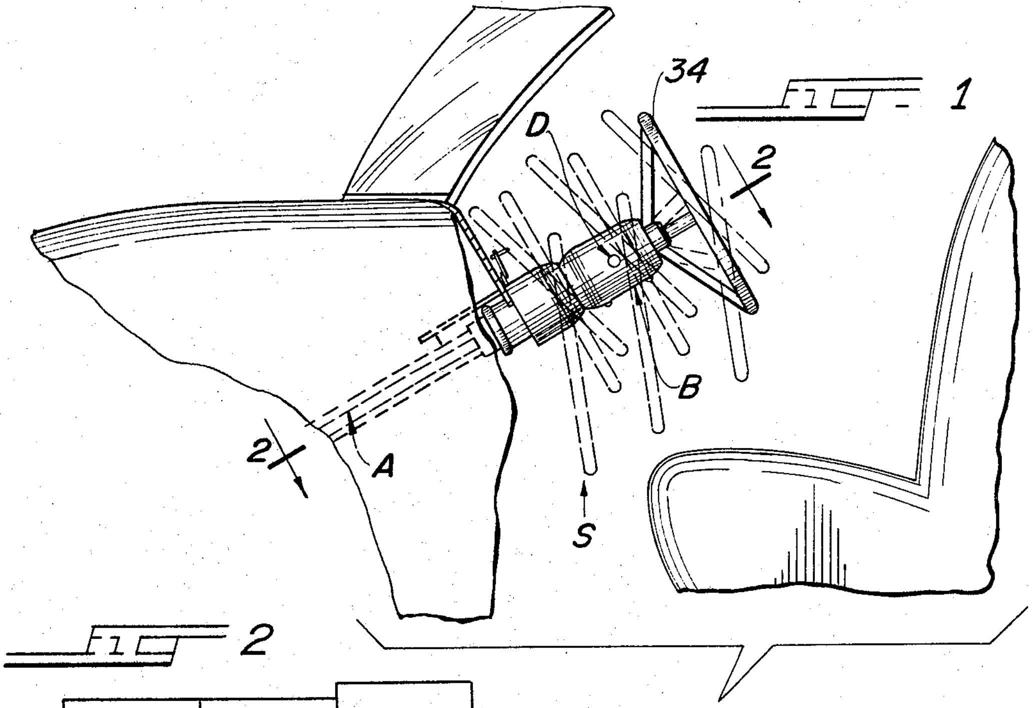
FIGURE 1 is a somewhat schematic illustration of a steering mechanism showing the relative disposition of a structure embodying the principle of this invention and certain operative positions thereof.
Figure 2:
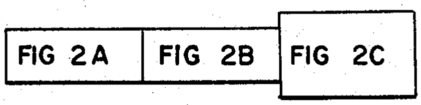
FIGURE 2 is a box diagram illustrating the arrangement of FIGURES 2A, 2B, and 2C.
Figure 6B:
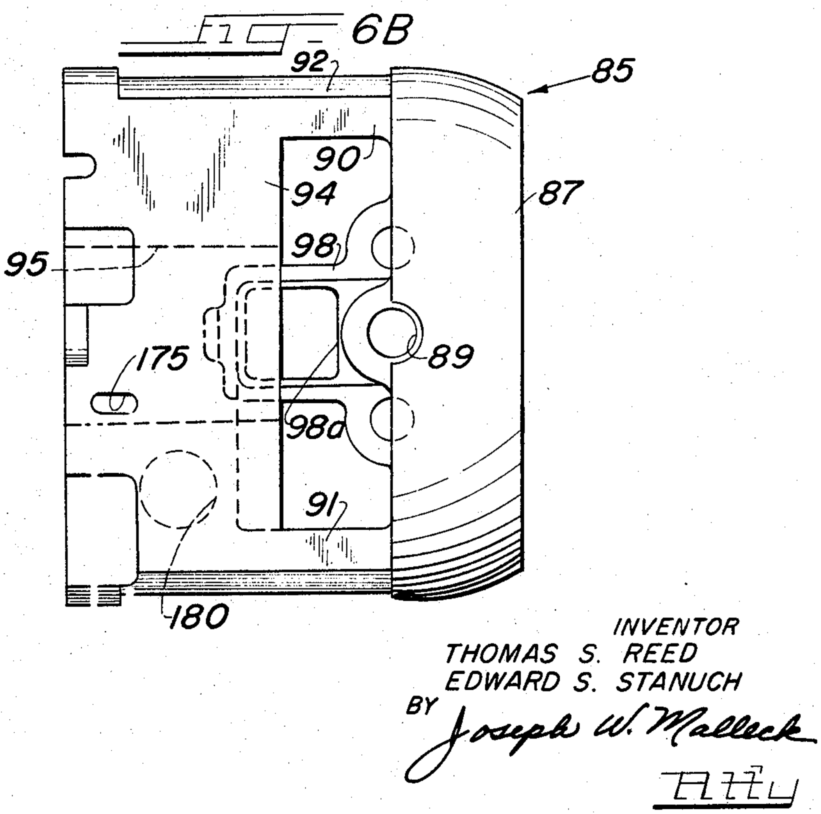
Figures 2A, 2B:
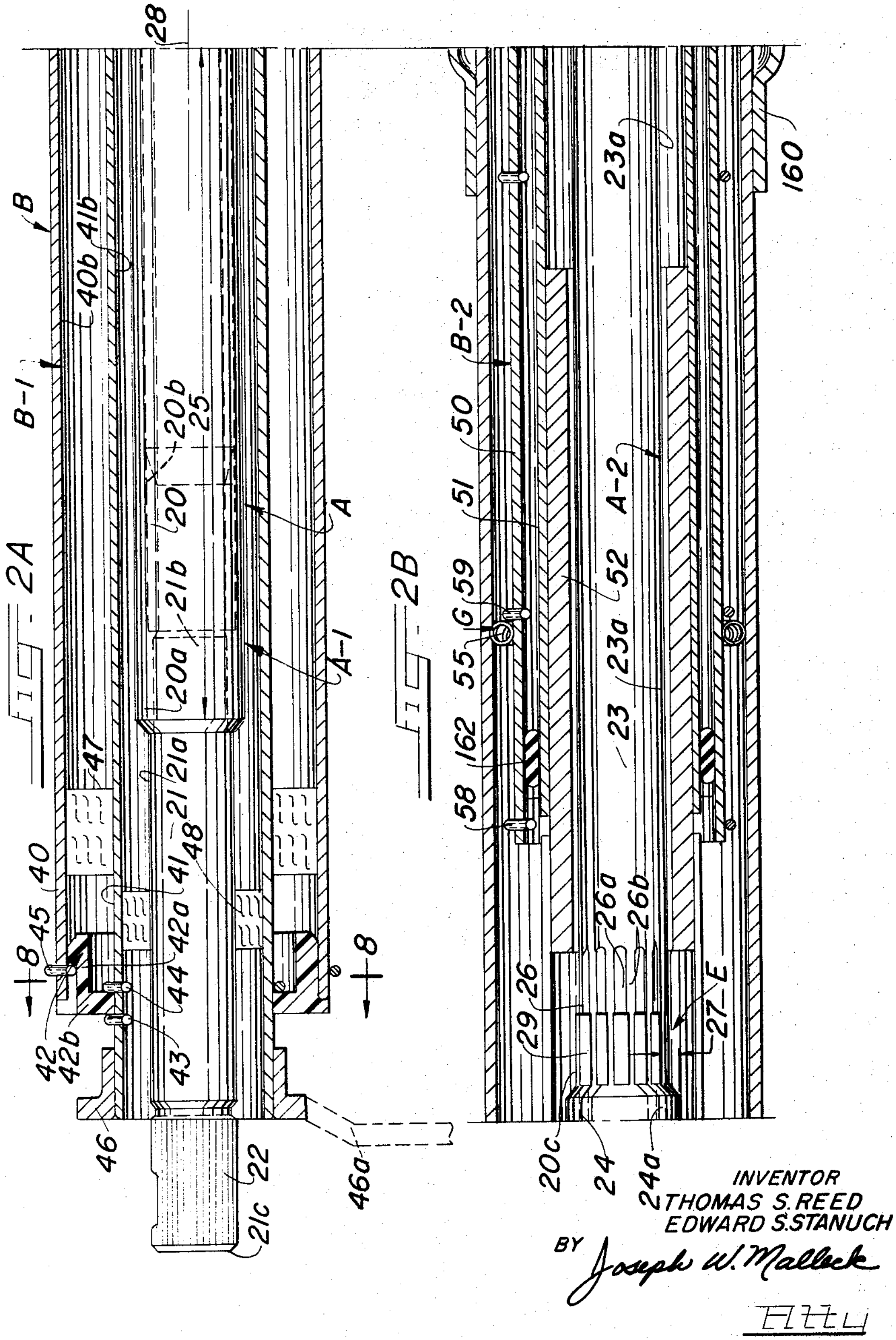
Figure 2C:
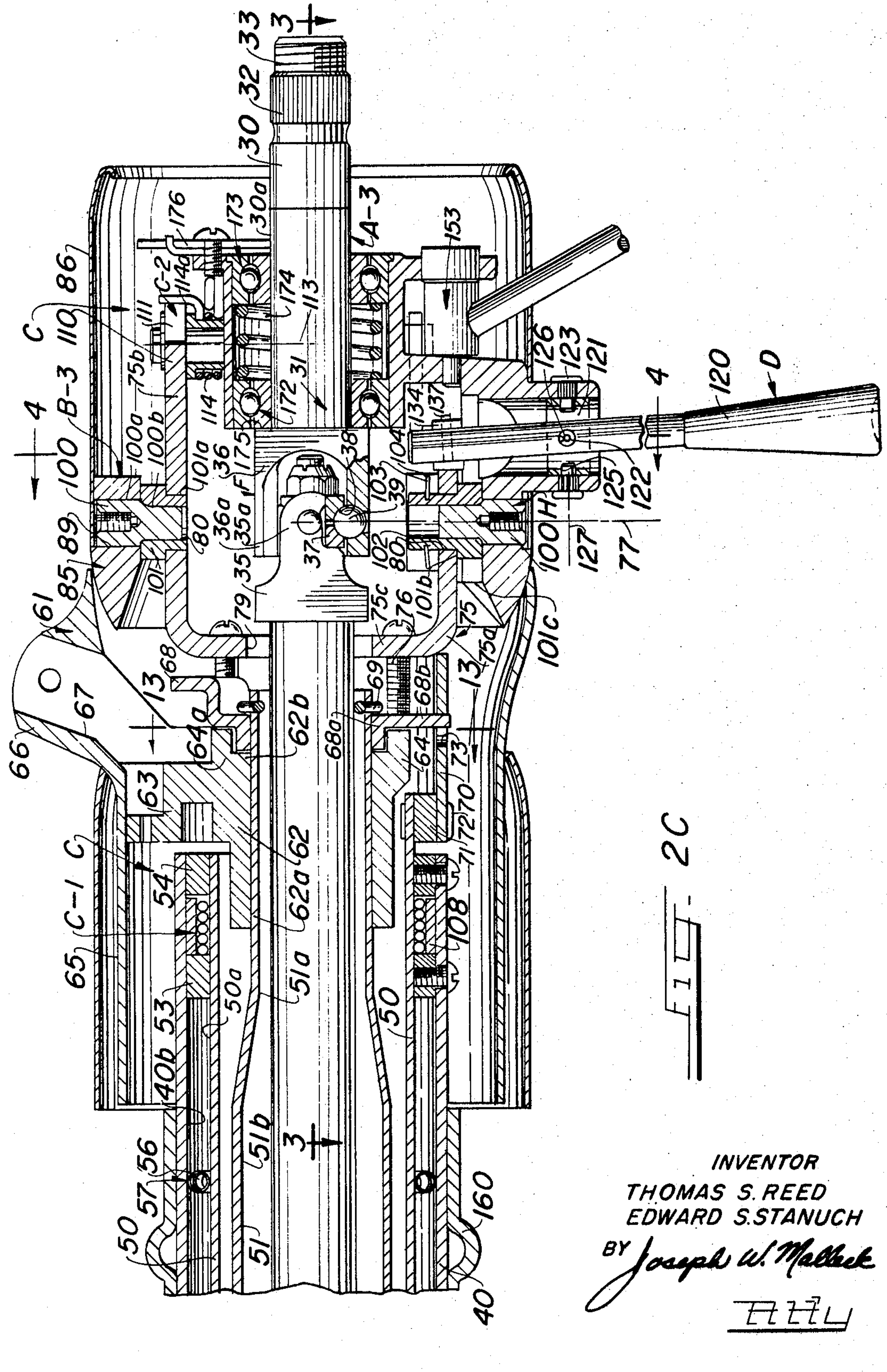
Figure 3:
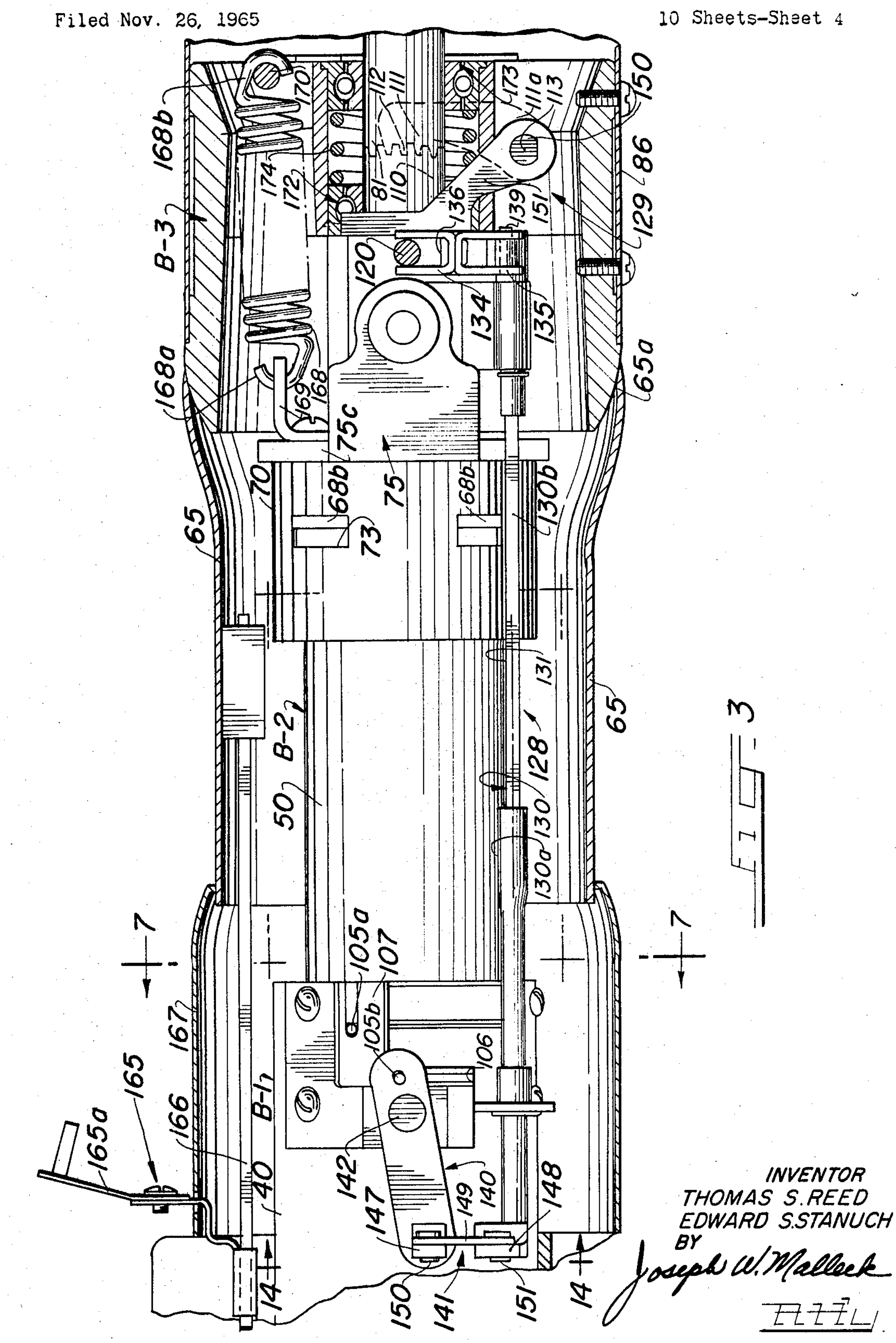
Figure 4:
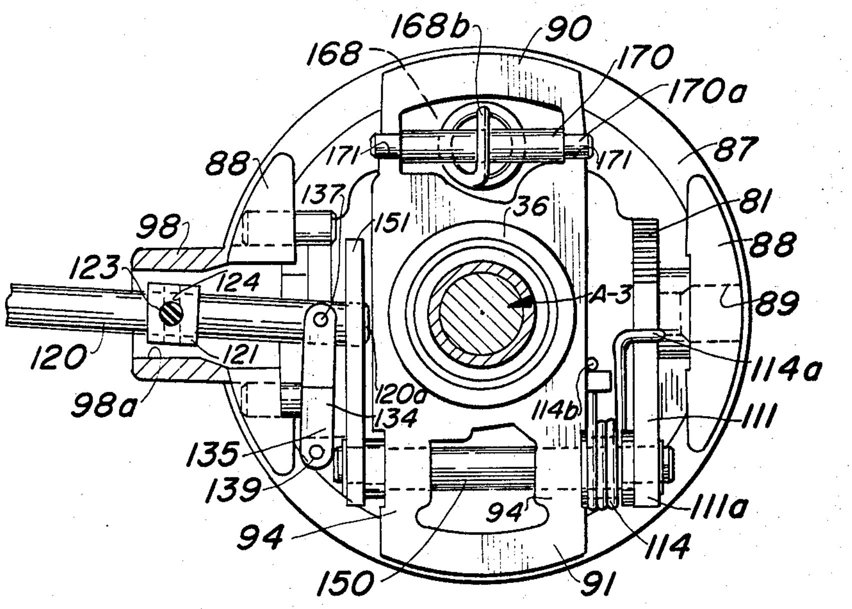
Figure 5:
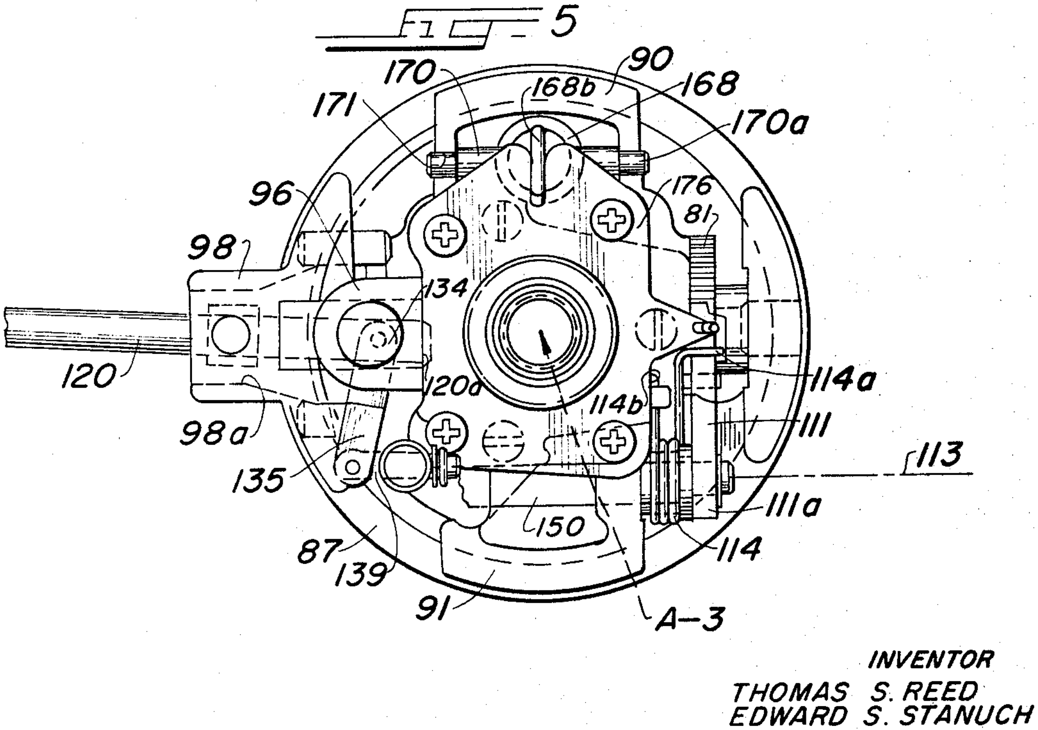
Figure 6A:
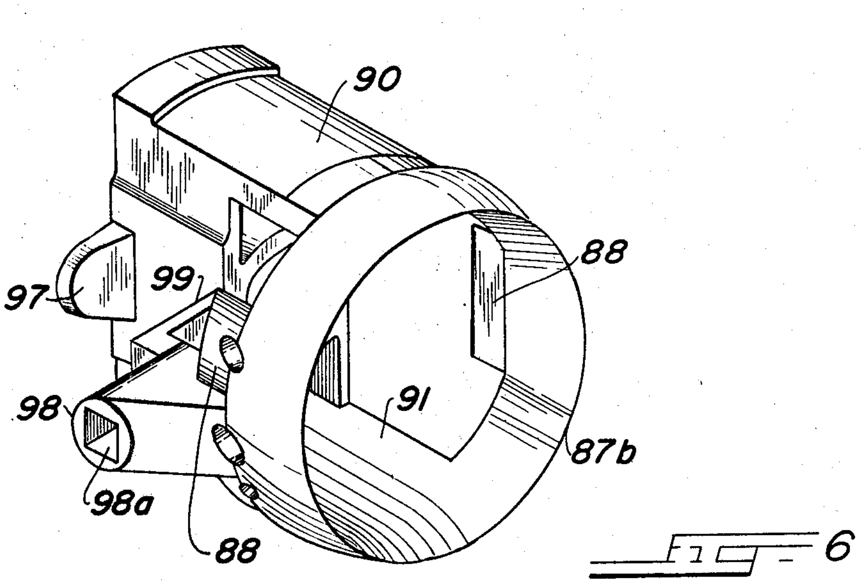
Figure 6:
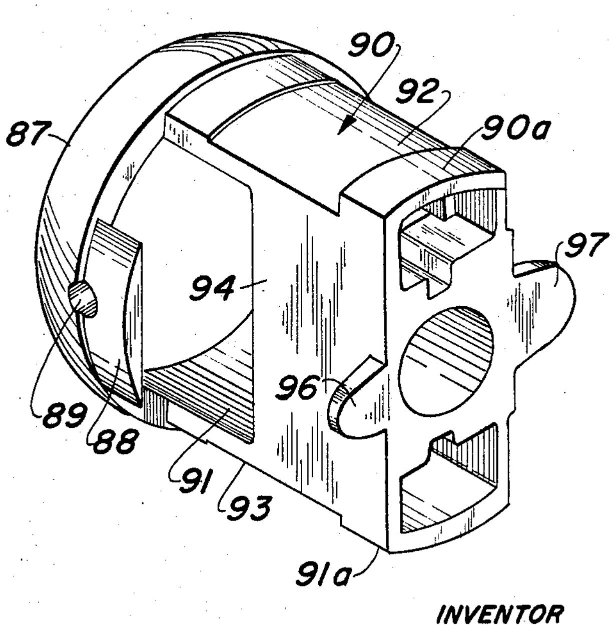
Figures 6C, 6D, 6E:
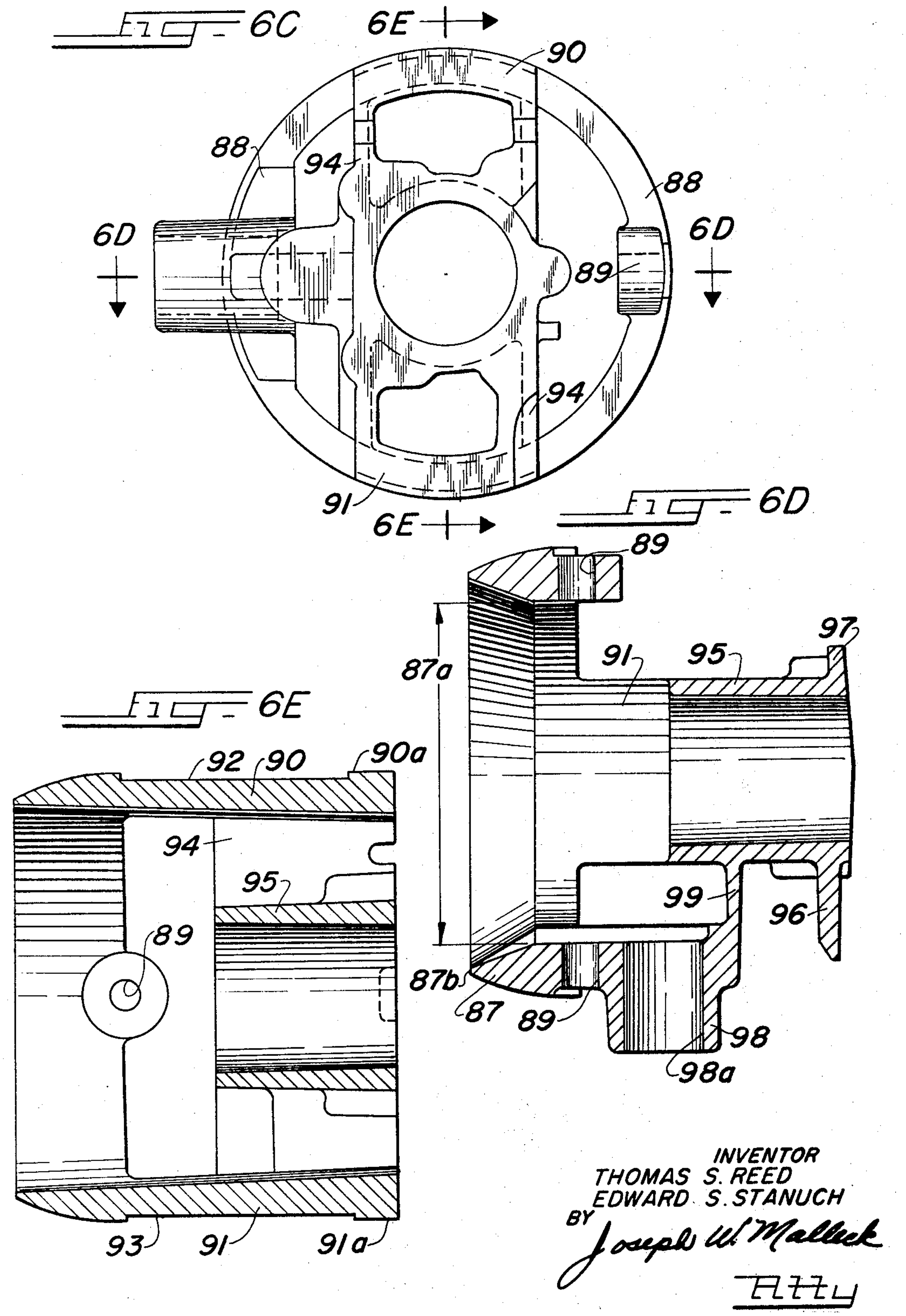
Figures 7, 8:
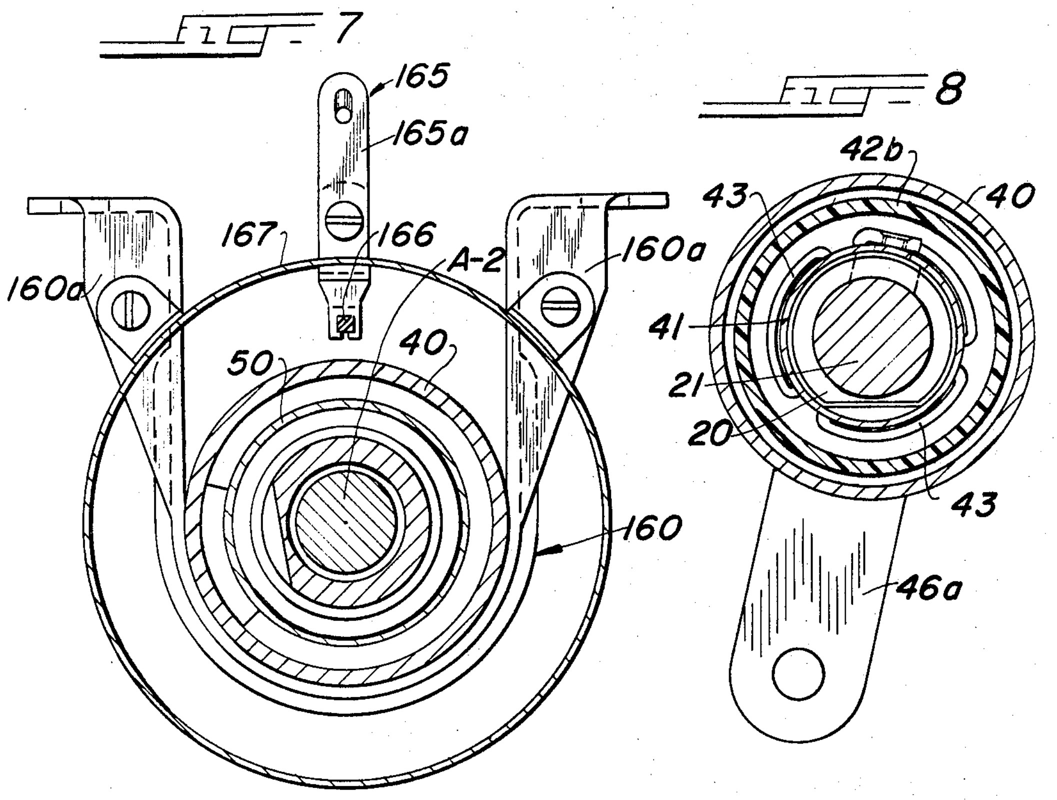
Figures 9, 10:
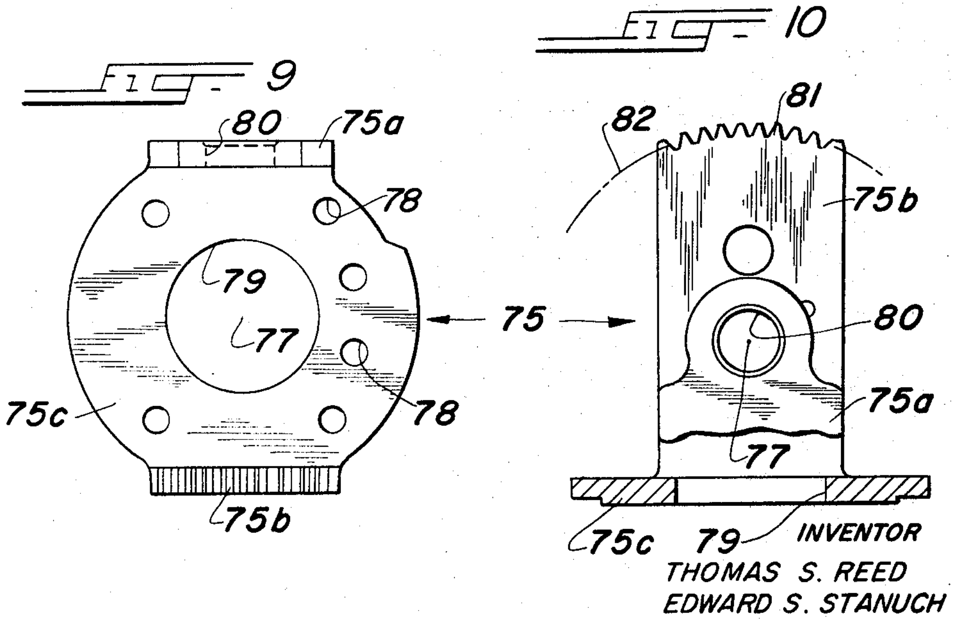
Figures 11, 12:
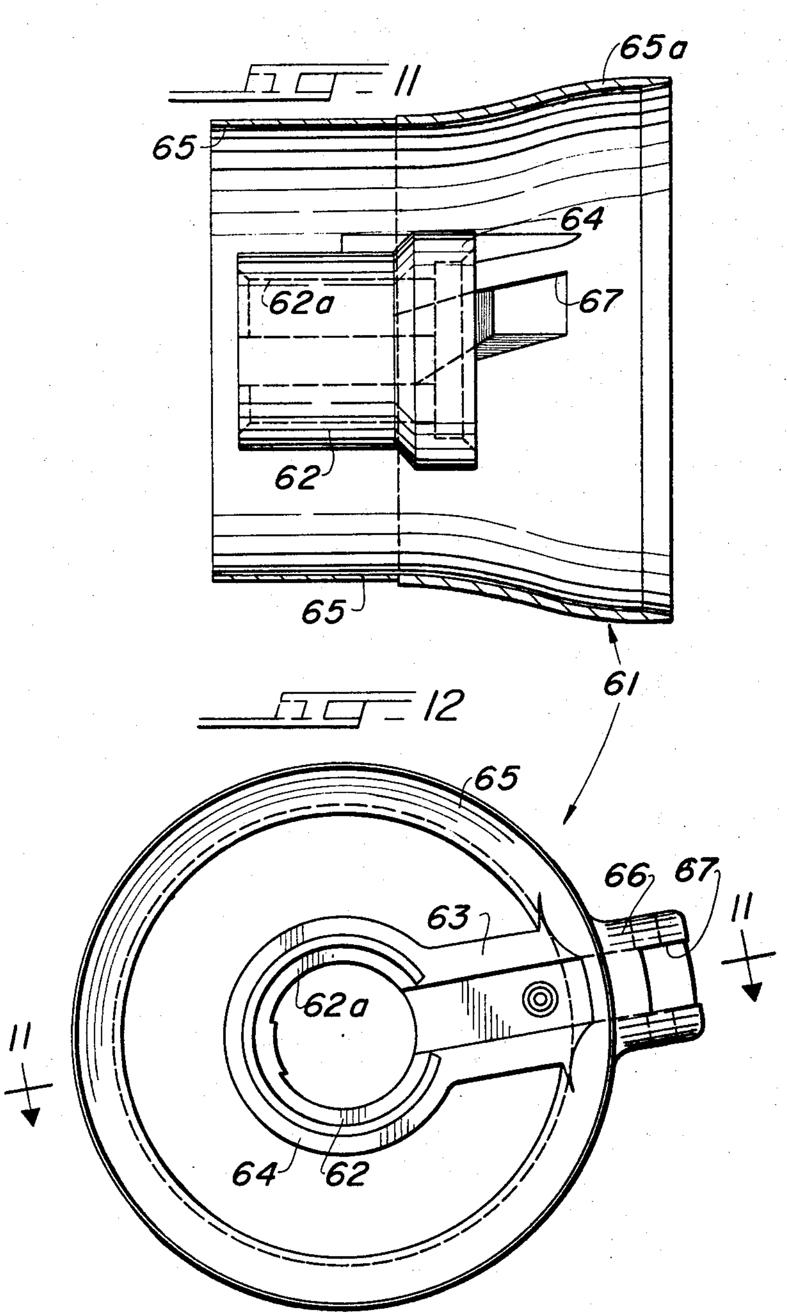
Figure 13:
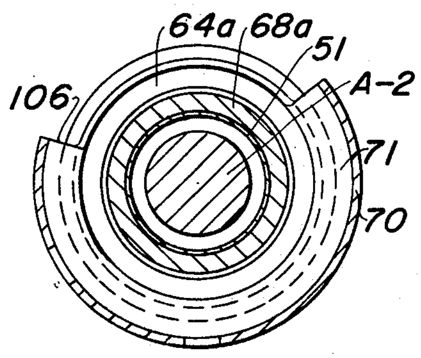
Figure 14:
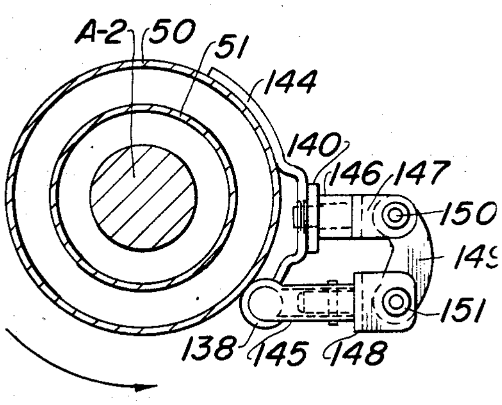
Figure 15:
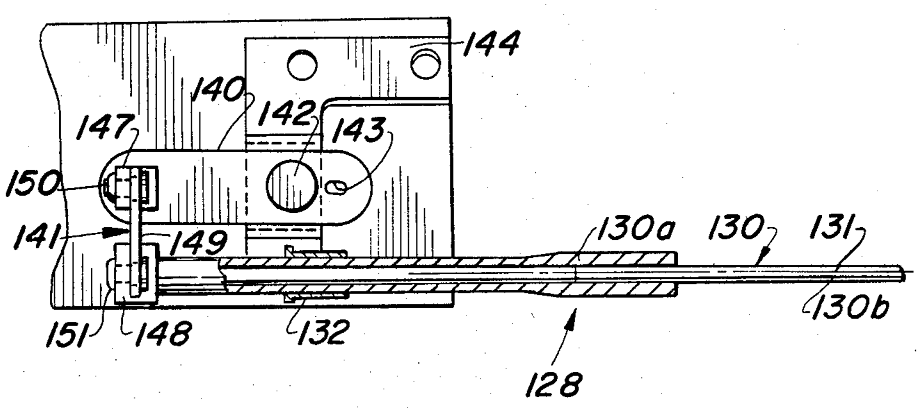

FIGURES 2A, 2B, and 2C illustrate an enlarged central sectional view of the steering column in FIGURE 1;

FIGURE 3 is a view partly in section taken substantially along line 3—3 of FIGURE 2C;

FIGURE 4 is a sectional view taken substantially along line 4—4 of FIGURE 2C;

FIGURE 5 is an end view of the structure shown in FIGURE 2C;

FIGURE 6 is a perspective view of a casting or housing element forming a part of the tiltable supporting structure;

FIGURE 6A is a perspective view opposite to that shown in FIGURE 6;

FIGURE 6B is an enlarged side-elevational view of the structure in FIGURE 6;

FIGURE 6C is an end view of the structure illustrated in FIGURE 6B;

FIGURE 6D is a sectional view taken substantially along line 6D—6D of FIGURE 6C;

FIGURE 6E is a sectional view taken substantially along line 6E—6E of FIGURE 6C;

FIGURE 7 is a sectional view taken substantially along line 7—7 of FIGURE 3;

FIGURE 8 is a sectional view taken substantially along line 8—8 of FIGURE 2A;

FIGURE 9 is an end view of the J-bracket forming part of the structure shown in FIGURE 2C;

FIGURE 10 is a side-elevational view of the J-bracket of FIGURE 9 having certain portions thereof broken away and shown related to a mounting member;

FIGURE 11 is a sectional view of the shift lever housing forming a part of the mechanism of FIGURE 2C and taken substantially along line 11—11 of FIGURE 12;

FIGURE 12 is an elevational view of the shift lever housing;

FIGURE 13 is a sectional view taken substantially along line 13—13 of FIGURE 2C;

FIGURE 14 is a sectional view taken substantially along line 14—14 of FIGURE 3; and FIGURE 15 is a fragmentary view, similar to that of FIGURE 3, showing a portion of the slip linkage and with certain portions thereof broken away.

Turning now to the drawings and particularly to FIGURE 1 and FIGURES 2A–2C, the steering mechanism or assembly S broadly comprises a steering linkage A comprised of portions A–1, A–2, and A–3; portions A–1 and A–2 being fixedly interconnected by a slip joint or longitudinal adjustment means E and portions A–2 and A–3 are flexibly interconnected for relative angular adjustment by universal joint means F. Steering linkage A is carried by a supporting means B comprised of sections B–1, B–2, and B–3; sections B–1 and B–2 are interconnected for longitudinal adjustment by means G and sections B–2 and B–3 are interconnected for angular adjustment by means H. A locking means C is employed for maintaining a specific locked condition of the supporting means and is comprised of a first portion or slip lock means C–1 and a second portion or angular lock means C–2 both coordinated and operated by a unitary control means D. The various slip joints E and G and angular joints F and H, along with the lock means C cooperate to provide an interconnecting assembly or means which will be more broadly referred to at times for relating the steering linkage to the supporting means of the specification.

Turning now in more particularity to the components of the steering mechanism, the linkage A has a lowermost base portion A–1 comprised of a hollow shaft 20 and a solid shaft 21 received by end 20*a* of the hollow shaft in a rigid power transmitting relationship. Such connection may be provided along a relatively minor end portion 21*b* of the solid shaft whereby the exterior surface 21*a* thereof is secured to the interior cylindrical surface 20*b* of hollow shaft 20. Splines 22 may be formed along the other end 21*c* of the solid shaft for permitting a driving connection to other linkage leading to members which must be steered (not shown).

The second portion A–2 (see FIGURE 2B) of the steering linkage comprises a solid shaft 23 having an interior cylindrical surface 23*a* and is interconnected with the first portion A–1 by the longitudinal slip means E permitting the portions A–1 and A–2 to be adjusted along an axis 28 which is coincident for each of said portions. The slip adjustment means, which would permit the telescoping of portion A–2 into portion A–1, comprises a plurality of longitudinally extending female splines 24 formed into the interior surface 20*b* of the hollow shaft 20. Each of the female splines are provided with sides 24*a* which are converging in a generally radially outward direction with respect to axis 28 and may preferably have an arcuate shape according to gear-tooth design. The bottommost portion of the female splines may extend along a substantial longitudinal extent 25 of the hollow shaft, to provide a commensurate degree of telescoping. A plurality of circumferentially arranged male splines 26 are formed on the exterior surface 23*c* of portion A–2 and are provided with sides 26*a* shaped complementary to the female splines and have an outermost flat surface 26*b*. Splines 24 and 26 are adapted to be intermeshed for providing a rotary driving relationship between portions A–1 and A–2. However, dimensional tolerance, to permit slip, inherently incorporates a slight degree of back-lash during the rotary turning of one portion relative to the other. To obviate this difficulty, the hollow shaft 20 has one end 20*c* defined with the outer cylindrical portion removed to a depth 27 whereby a plurality of flexible fingers 29 are defined thereby; the fingers are then given a slight bias in a radially inward direction relative to axis 28 thereby causing them to wedgingly take up slack between the sides 24*a* and sides 26*a* of the respective male and female splines.

The third portion A–3 of the steering linkage comprises a solid stub shaft 30 having an outer cylindrical surface 30*a* which has defined at the forward end thereof annularly arranged splines 32 and adjacent thereto a plurality of threads 33 of reduced diameter for coupling to a steering wheel assembly 34. The other end 31 of the stub shaft is related to the portion A–2 by the angular adjustment means F which particularly comprises an anti-backlash universal joint having a yoke 35 coupled to forward end of the portion A–2 and another yoke 36 integrally coupled to end 31 of the stub shaft. Each of the yokes have spaced ears 35*a* and 36*a*, respectively, between which is disposed a connecting member 37 and adapted for universal joint action with said yoke by way of grooves 38 defined in each of the yoke ears and adapted to permit the movement of rollers 39 received in said grooves in planes perpendicular to each other for universal angular action.

The supporting means B is particularly comprised of a first section B–1 which has a pair of radially spaced cylindrical walls 40 and 41, the outermost wall having sufficient longitudinal length to extend substantially along the combined length of the inner steering linkage A–1 and A–2. The outer wall 40 may be supported by a bracket 160 (see also FIGURE 7) to be fixed against both longitudinal and angular movement by ears 160*a* fastened to a portion of the vehicle. The inner wall 41 is carried therein by a nylon bushing 42 having a cylindrical lip 42*a* engaging the inner surface 40*a* of the outer wall and a radial wall 42*b* having an opening 42*c* receiving the wall 41. Retainers 43 and 44 are employed to station the bushing 42 on the inner wall 41 and a retainer 45 is employed to station the annular lip 42*a* with respect to the interior of the outer wall 40. A journal 46 is stationed on the most extreme terminal end of the inner wall 41 and has a mounting flange 46*a*. Sound absorbing packing 47 may be employed to reduce the transmission of sound through the space between the inner and outer walls 40 and 41 and similarly sound absorbing packing 48 may be employed between the steering linkage portion A–1 and wall 41.

The intermediate section B–2 of the supporting structure comprises spaced walls 50 and 51, the outer wall 50 being generally cylindrically shaped throughout; the inner wall 51 is substantially cylindrical but has a neck down portion 51*a* at the forward end thereof. An elongated sleeve or bushing 52 is provided to engage the inner surface 51*b* of wall 51 and also the inner surface 41*b* of wall 41 to provide a support or bearing in conjunction with the inwardly disposed steering linkage; and a nylon bushing 162 is employed to space walls 50 and 51. Nylon spacers or bushings 53 and 54 are disposed between the outer surface 50*a* of wall 50 and the inner surface 40*b* of wall 40 at the forward end thereof. The bushings are spaced apart sufficient longitudinal dimensions to receive the slip lock means C–1 and act as longitudinal stops for cooperating with such lock means. The longitudinal adjustment means G, providing slip movement between sections B–1 and B–2, particularly comprises a pair of longitudinally spaced helically coiled garter springs 55 and 56, each having a sectional diameter 57 sufficient to permit bearing interengagement between the respective walls. Stops or rings 58 and 59 are mounted on wall 50 for limiting the longitudinal movement of garter spring 54; and stop ring 60 and spacer 53 limit longitudinal movement of garter spring 56. The stops are spaced to provide a predetermined "travel" or roll of the garter springs about their own centerline while slip between sections B–1 and B–2 is taking place.

Associated with the intermediate section B–2 is a shift lever housing or bracket 61 (see also FIGURES 11 and 12) particularly defined with a double wall configuration wherein a central or radially inner sleeve wall 62 is spaced from an outer generally cylindrical wall 65 by at least one stepped web or arm 63. The inner wall has an inner surface 62*a* effective to receive the outer surface of the necked down portion 51*a* of wall 51. An arcuate shoulder 64 is formed on the front end 62*b* of the inner wall and has an integral arcuate lip 64*a* spaced from the wall 51.

The outer wall 65 is provided with a slightly enlarged mouth 65*a* at one end and in which is defined an opening 67 surrounded by a lever mounting 66 integrally formed on the outer wall and effective to cooperate with a shift lever (of conventional construction) which would extend through opening 67 and connect with a portion of a shift ring or bracket 68; the shift ring has a central neck 68*a* mounted on the front end of the necked down portion of wall 51 section A–2 and is enveloped by lip 64*a* to permit arcuate movement thereon. Clip 69 is employed to maintain the nested relation of shift ring 68. The ring 68, under influence of the shift lever, is capable of influencing a speed-change within a mechanical speed-change box (not shown) by way of the tubular wall 51 which is adapted for arcuate movement independently of wall 50; and at a remote end tube 51 may be connected to the mechanical speed-change box by suitable linkage. Wall 50 carries a cylindrical extension 70 spaced radially outwardly therefrom by spacers 71 held in place therebetween by fasteners 72, the extension having circumferentially spaced openings or notches 73 to receive tongues 68*b* of the ring 68 for providing a turning coupling therebetween. The extension also has an opening 163 permitting arm 63 of the shift lever housing to extend therepast (see FIGURE 13).

A shift quadrant or indicator 165 (see FIGURES 3 and 5) may be employed having a telescoping rod 166 responsive to movement of the shift lever to move an indicator 165*a*; a shielding shell 167 may be rigidly mounted about the shift lever housing.

Also associated with the section B–2 of the supporting structure, is a J-bracket 75 (see also FIGURES 9 and 10) having a base portion 75*c* which is generally circular in configuration and is attached to the wall 51 (this may be accomplished by fasteners 76 threadably extending through openings 78 in base 75*c* into an extension of wall 51). A central opening 79 is formed in base 75*c* to permit the shaft 23 of portion A–2 to extend therethrough in spaced relationship. The J-bracket has legs 75*a* and 75*b* extending outwardly and forwardly from opposite sides of the base 75*c*. Leg 75*b* is considerably longer, when viewed as in FIGURE 2C; each of the legs have an opening 80 commonly aligned about axis 77 which forms a principal axis for bending or angular movement of the steering column as will be described. The terminal end or edge of leg 75*b* is provided with a plurality of projections or teeth 81 arranged along an arc 82 having a radius defined with a center lying on the axis 77.

Turning now to section B–3, it has a casting or housing structure 85 (see also FIGURES 6–6E; FIGURES 6A and 6B depicting the casing before certain machining operations) forming a part of a tiltable upper head for the steering mechanism which receives and supports a covering or shell 86. The casting 85 comprises a rearward ring portion 87 having an inner diameter 87*a* greater than the spacing of the J-bracket legs. The ring portion 87 has a tapered portion terminating in a generally sharp lip 87*b*; the tapering facilitates pivotal movement of the casting relative to the J-bracket. Extending forwardly from the ring 87 are diametrically spaced wings 88 which in part defined opposed openings 89 arranged concentrically about axis 77 when installed in FIGURE 2C. From diametrically opposite sides of the ring portions extend panels 90 and 91 each having a slightly arcuate shape; the panels have an outer surface 90*a* and 91*a* respectively within which is defined a transverse recess 92 and 93 respectively. Disposed at the forward portion of the casting are spaced transverse webs 94 which interconnect the panels. The webs are effective to integrally carry a central sleeve 95 forming an inner wall for the forward section B–3. Sleeve 95 journals spaced bearings 172 and 173 longitudinally biased apart by a spring 174 and limited by shoulders 175 and plate 176 at outer points; portion A–3 is received by the bearings and oppositely extending flanges 96 and 97 are formed on the forward terminal portion of sleeve 95. The casting has integrally formed journal 98 at one side thereof intermediate the panels and has an interior cylindrical surface 98*a* carrying the unitary control member D as shown in FIGURE 2C. The forward portion of the journal 98 is secured to the end sleeve by supplementary web 99.

Section B–3 is related to the J-bracket by the pivot means H which particularly comprises stepped pins 100 carried within openings 89 of the casting ring portion. Each pin has a major cylindrical surface 100*a* snugly received by the inner wall of opening 89 and a stepped or reduced cylindrical surface 100*b* carrying a sleeve 101. Each of the sleeves are also stepped having a reduced cylindrical surface 101*a* snugly fitting or received by an opening 80 in each of the legs or the J-bracket and an annular shoulder 101*b* separating the major cylindrical surface 101*c*. Each of the sleeves may be of an anti-friction material such as nylon. At least one of the sleeves is in position by shoulder 101*b* engaging the J-bracket and a retainer cap 102 carried at the sleeve inner end. The retainer cap is held in place by a clip 103 received in suitable grooving 104 of the retainer.

The section B–3 is normally biased to an extreme angular or raised position by a coiled tension spring 168 (see FIGURES 3, 4 and 5) having one end 168*a* connected to a member 169 attached to the J-bracket and an opposite end 168*b* attached to a bar 170 carried forwardly between the webs 94 of the casting (reduced ends 170*a* of the bar are received in openings 171 of the webs).

Turning now to the lock means C, and first particularly to the assembly C–1 which provides for longitudinal or slip locking of the supporting structure B. Assembly C–1 has a helically coiled strand or wire 105 (see FIGURES 2C and 3) arranged about the outer surface of tubular wall 50, the helical direction being such that holding of the forward end 105*a* of the strand (which extends radially or transversely outwardly from the coil) while moving the other end 105*b* (which also extends transversely outwardly from the helical coil) in a counterclockwise direction as viewed in FIGURE 14, unwraps the strand thereby tending to loosen its normal resilient gripping of wall 50. The strand is given a preformed helical shape such that in its unflexed condition it has an internal diameter less than the diameter of the outer surface of wall 50 thereby promoting clamping or locking action when assembled thereabout. To promote the movement or holding of the various ends of the strand, suitable notching 106 of the wall 50 at its outer end is provided. Notch 106 may be defined so that it is sufficiently small to hold the end 105*a* in place or an independent bracket may be applied thereover to achieve such function. For purposes of permitting an arcuate movement of the outer end of 105*b*, the notching 106 should be made suitably wide (as shown in FIGURE 13). An entrainment sleeve 108 may be employed to insure that the helical strand will maintain its proper shape as shown in FIGURE 2C. Since strand 105 is mounted to wall 40, locking of the spring causes wall 50 to be associated against movement until selectively released.

The second lock assembly C–2 comprises interengageable element 110 (constituting the outer end of the longest leg 75*b* of the J-jacket 75) and an independently pivotal element 111. Each of the elements have toothed projections 81 and 112 respectively lying on arcuate paths complementary to each other when interengaged. The pivotal element 111 comprises a pawl which has a remote end 111*a* carried about an axis 113 off-set from the principal axes 28 and 77 of the support means B. Element 111 is normally urged to an interengaged condition by torsion spring 114 having one end 114*a* transversely extending outwardly therefrom to engage the back edge of the pawl and an opposite end 114*b* held against torsion movement by being retained in an opening 175 in the casting sleeve 95.

The unitary control means D comprises a lever 120 extending through the opening 98a of the journal 98 for the casting of section B–3 and is universally mounted therein by a yoke 121 which is generally rectangular in configuration having a pair of spaced journal pins 122 carried between the lever and yoke in openings 124 and thereby defining an axis of movement 126 generally perpendicular to the axis 28 of the supporting means B. The yoke frame 121 is in turn pivotally carried by another pair of journal pins 123 received in the journal 98 and each pin having inner end pivotally received in an opening 125 of the frame; openings 125 are in sides of the frame opposite from those of openings 124. Pins 123 are effective to provide pivotal movement of the yoke frame about an axis 127 which is perpendicular to axis 126 thereof.

The control member D is effective to independently or simultaneously provide for selective release of the lock assemblies C–1 and C–2 by a single movement. To promote solely disengagement of the angular lock assembly C–2, the control member would be moved about the axis 126 of the lever mounting which generally corresponds to movement in a plane parallel to the axis of steering portion A–3. Movement solely about axis 127 of the lever mounting will promote selective release solely of the locking assembly C–1 (which corresponds to movement in a plane perpendicular to the axis of the steering portion A–3). Such planes are mutually perpendicular to each other and if the control member is moved in a plane which is intermediate these perpendicular planes, a varying degree of simultaneous disengagement of both the locking assemblies will take place.

Mechanical linkages 128 and 129 are provided to translate the movement of the control member to effect the selective releases of the lock assemblies C–1 and C–2. More patricularly, linkage 128 (connecting with the slip lock assembly C–1) comprises a telescoping rod assembly 130 (see FIGURES 3, 15, 4 and 5) extending along a center line or axis 131 which is closely adjacent the interior surface of the steering column shell 65 and off-set from any of the principal axes 28 and 77. The rod assembly comprises a socket portion 130a mounted rearwardly of the supporting section B–2 and is carried by a saddle 132 (here preferably a split plastic bushing which can be popped to recline the rod socket) and which is in turn fastened to the wall 40 thereof. The socket portion 130a receives a rod 130b therein for telescoping movement, the rod 130b extending forwardly along the steering column so as to have a forward end disposed slightly below and near the inner end 120a of the control lever. The rod 130b is supported for longitudinal movement by another saddle 133 carried by the J bracket of section B–2. The forward end of the rod 130b (having an off-set crank) is connected to the lever 120 by a pair of swivel yokes 134 and 135 the base of each of the yokes being mated back to back and connected by a swivel rivet or pin 136; the spaced ears of yoke 134 receive the lever end 120a and are connected thereto by a suitable pin 137 disposed in a direction parallel to the axis 127 of the lever mounting. The other yoke 135 has spaced ears receiving the forward end or crank of the rod 130b therethrough along a line parallel to centerline 131. The rod assembly 130 has cranks 138 and 139 at opposite ends thereof to translate the movement of the lever about axis 127 into a rotary movement of the rod assembly; about axis 131 rotative drive between portions 130a and 130b is promoted by having the cross-section of the rod and socket portion non-circular (here square).

The rotary movement of the crank 139 of the rod assembly is translated into rotary movement for the lock spring end 105b by virtue of an arm assembly 140 and a swivel assembly 141 (see also FIGURES 14 and 15). The arm of assembly 140 is mounted by virtue of a pin 142 journalled in bracket 144 and defining an axis or pivoting for the arm which is perpendicular to the centerline 131 for the rod assembly 130; the arm has an opening 143 receiving the end 105b of the helical strand on the end thereof. The opposite end of the arm is connected to the swivel assembly 141. The swivel assembly comprises a pair of swivel sockets 145 and 146 each extending transverse to the general extent of the steering column, the swivel socket 145 being defined integrally as a turned end or crack 138 of the socket portion. Swivel socket 146 is an independent ferrule carried by the arm 140. Received respectively in each of these swivel sockets are pins 147 and 148 each having an off-set ear for carrying an interconnecting swivel link 149. The link 149 is mounted to the respective ears by pins or rivets 150 and 151 which have a centerline parallel to the axis 28.

The mechanical linkage 129, interconnecting the control member with the lock assembly C–2, comprises (see FIGURES 2C, 3 and 4) in part the lock pawl 111 which is drivingly mounted upon one end of a shaft 150 which extends along the axis 113 as shown in FIGURES 4 and 5 (shaft 150 being journalled in openings 180 defined in webs 94 of section B–3). The opposite end of the shaft 150 carries an actuating arm 151 drivingly keyed thereto, the outer end of the actuating arm being adjacent the inner end 120a of the control member for actuation in an arcuate or pivotal manner when the control member is pivoted about axis 126 of its mounting. The lock pawl 111, arm 151, and the shaft 150 together comprise a linkage which permits an extreme degree of compactness of the upper tiltable head of the steering column. For example, such auxiliary equipment, as turning signals 153, may be closely stationed in the steering head without the necessity of special provision as has been necessary in prior art devices.

While we have described our invention in connection with one specific embodiment and other alternative suggestions thereof, it is understood that this is by way of illustration and not by way of limitation and the scope of our invention is defined solely by the appended claims which should be construed as broadly as the prior art will permit.

We claim:

1. A steering assembly, comprising: steering linkage having a plurality of portions synchronously movable for steering purposes and flexibly jointed for relative bending about at least a first axis and slidably movable relative to each other about at least a second axis; means for supporting and enclosing said linkage having a plurality of sections flexibly jointed for relative bending about at least said first axis and slidably movable relative to each other about at least said second axis; means operaoly interconnecting said supporting sections and portions for providing coordinated flexing therebetween; and unitary control means operatively associated with said steering linkage effective to assume a first position to allow bending of said portions relative to said first axis, to assume a second position to allow slidable movement of said portions relative to said second axis, and to assume intermediate positions to allow bending of said portions relative to said first axis and sliding movement of said portions relative to said second axis.

2. A steering assembly, comprising: steering linkage having a plurality of portions synchronously movable for steering purposes and flexibly jointed for relative bending about at least a first axis and for relative sliding movement about at least a second axis; means for supporting and enclosing said linkage having a plurality of sections flexibly jointed for relative bending about at least said first axis and for relative sliding movement about at least said second axis; means operably interconnecting said supporting sections and portions for providing coordinated flexing therebetween; means normally locking said sections in a selected position about said second axis and in a selected angular position about said first axis; and control means having a unitary operating member for releasing said locking means to permit selective movement about said axes, said member being pivotally mounted and associated with said locking means so that when moved in mutually perpendicular first and second planes said member will be capable of effecting independent release of said locking means and when moved in planes intermediate said perpendicular planes varying degrees of simultaneous release of both said lock assemblies will be effected.

3. A steering assembly as in claim 2, in which said locking means includes a first lock assembly comprises a helical strand coiled about at least one of said supporting means sections with one end of said supporting means sections with one end of said strand held against rotation about said second axis and another end rotatably actuatable about said second axis, linkage interconnecting said actuatable end of said strand with said control member whereby upon movement of said member in said first mutually perpendicular plane said strand will be caused to unwind and thereby release said supporting means section for sliding movement relative to the other sections.

4. A steering assembly as in claim 3, in which said linkage for said first lock assembly comprises a telescoping rod extending along said second axis but spaced therefrom, said telescoping linkage having a crank at one end operably connected with said control member and a crank at an opposite end thereof operably connected with said actuatable strand end.

5. A steering assembly as in claim 2, in which said locking means includes a second lock assembly comprises interengageable elements each carrying projections thereon adapted for being intermeshed when said elements are interengaged, one of said elements being fixedly carried by one of said supporting means sections and the other element pivotally carried by another of the supporting means sections, linkage operably interconnecting said pivotal element with said control member in said second mutually perpendicular plane, whereby said elements will be urged out of engagement thereby freeing said sections for flexing movement about said first axis.

6. A steering assembly as in claim 5, in which the projections on said one element are arranged along an arc having a radius with a center lying on said first axis, and said projections on said other pivotal element being arranged complementary to the arc for said projections on said one element.

7. A steering assembly as in claim 5, in which said pivotal element is connected to said operating member by linkage wherein said pivotal element comprises one arm of a shaft carried on a third axis and another arm carried at the opposite end of said shaft adapted to be engaged by such control member.

8. A steering assembly as in claim 7, in which said pivotal element is normally biased toward engagement with the other of said elements.

9. A steering assembly as in claim 8, in which said biasing means comprises a torsion spring having one end secured to one of said supporting means sections and another end in engagement with said pivotal element, the spring being capable of torsionally urging said pivotal element into engagement with said other elements.

10. A steering assembly as in claim 1, in which said means operably interconnecting said supporting means sections has a first assembly for providing relative sliding movement between at least two of said sections, said first assembly comprising overlapping walls one each on one of said sections, at least one helically coiled spring interposed in contacting relation between said overlapping walls, each spring having an axis of rolling, and limits of slip movement disposed on opposite sides of said spring whereby sliding movement of one section relative to the other is facilitated by said spring rolling about its own axis until stopped by one of said limits.

11. A steering assembly as in claim 10, in which said slidable sections have tubular walls arranged concentrically with respect to each other, and at least one pair of springs spaced apart along said tubes and each having their own longitudinal limits whereby they may roll for providing a bearing relationship between said tubular walls.

12. A steering assembly as in claim 2, in which at least two of said steering linkage portions have means for providing a sliding interconnection therebetween and which more particularly comprises splines formed on each sections adapted for being intermeshed to provide a rotary driving relationship about said second axis, each of said splines having generally radially directed transverse sides, and resilient fingers formed on one of said sections adapted to resiliently wedgingly engage the sides of the splines of said other section whereby rotary slack between said portions substantially is reduced.

13. A steering assembly as in claim 2, in which said supporting means sections each have radially spaced tubular walls, the outermost section being adapted for bending movement relative to the other sections of said supporting means and comprising an interrupted outer tubular wall integrally connected to the radially inner wall by at least one radially directed web.

14. A steering assembly as in claim 13, in which said outermost section has an annular ring portion integrally connected to said interrupted outer wall, said ring carrying journals for defining said first axis of bending movement, and the section adjacent to said outermost section carrying a J-shaped bracket with legs thereof having journals cooperating with the journals of said outermost section to complete said first axis of bending movement.

References Cited

UNITED STATES PATENTS

| | | | |
|---|---|---|---|
| 3,214,994 | 11/1965 | Tolan | 74—493 X |
| 3,245,282 | 4/1966 | Kimberlin | 74—493 |
| 3,285,090 | 11/1966 | Cranbury | 74—493 |
| 3,302,478 | 2/1967 | Pauwels | 74—493 |

FOREIGN PATENTS

| | | |
|---|---|---|
| 479,533 | 2/1938 | Great Britain. |

MILTON KAUFMAN, *Primary Examiner.*

UNITED STATES PATENT OFFICE
CERTIFICATE OF CORRECTION

Patent No. 3,386,309

June 4, 1968

Thomas S. Reed et al.

It is certified that error appears in the above identified patent and that said Letters Patent are hereby corrected as shown below:

Column 9, line 11, cancel "with one end of said supporting means"; line 12, cancel "sections".

Signed and sealed this 9th day of December 1969.

EAL)

ttest:

lward M. Fletcher, Jr.

testing Officer

WILLIAM E. SCHUYLER, JR.

Commissioner of Patents